United States Patent
Maslov et al.

(10) Patent No.: US 7,706,105 B2
(45) Date of Patent: Apr. 27, 2010

(54) HARD DISK DRIVE, SUSPENSION ASSEMBLY OF ACTUATOR OF HARD DISK DRIVE, AND METHOD OF OPERATION OF HARD DISK DRIVE

(75) Inventors: Leonid Maslov, Yongin-si (KR);
Cheol-soon Kim, Anyang-si (KR);
Jin-gyoo Yoo, Seongnam-si (KR);
Haeng-soo Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 772 days.

(21) Appl. No.: 11/651,541

(22) Filed: Jan. 10, 2007

(65) Prior Publication Data

US 2007/0159726 A1  Jul. 12, 2007

(30) Foreign Application Priority Data

Jan. 11, 2006  (KR) .................... 10-2006-0003117

(51) Int. Cl.
*G11B 5/48* (2006.01)
(52) U.S. Cl. .................................... 360/245.1
(58) Field of Classification Search ........................ None
See application file for complete search history.

(56) References Cited

U.S. PATENT DOCUMENTS

| 6,445,546 | B1 * | 9/2002 | Coon ....................... 360/245.7 |
| 6,556,384 | B1 * | 4/2003 | Inoue et al. .............. 360/245.7 |
| 6,757,137 | B1 * | 6/2004 | Mei ......................... 360/245.7 |
| 6,980,400 | B2 * | 12/2005 | Girard ..................... 360/245.7 |
| 2002/0075602 | A1 * | 6/2002 | Mangold et al. ......... 360/245.7 |
| 2003/0137774 | A1 * | 7/2003 | Fu et al. ................... 360/245.7 |
| 2005/0018359 | A1 | 1/2005 | Hirano et al. |
| 2005/0047021 | A1 * | 3/2005 | Kim et al. ................ 360/245.7 |
| 2005/0157428 | A1 * | 7/2005 | Choi ........................ 360/245.7 |
| 2008/0239577 | A1 * | 10/2008 | Zeng et al. ................ 360/245.1 |

FOREIGN PATENT DOCUMENTS

| JP | 2004-213820 | 7/2004 |
| KR | 1020000053051 A | 8/2000 |
| KR | 1020040042899 A | 5/2004 |

* cited by examiner

*Primary Examiner*—Mark Blouin
(74) *Attorney, Agent, or Firm*—Volentine & Whitt, PLLC

(57) ABSTRACT

A suspension assembly of an actuator of a hard disk drive prevents collisions with a data storage disk of the drive. The suspension assembly includes a load beam, a bracket having a rear end at which the bracket is coupled to the load beam and a flexure, a slider that is attached to the bracket and carries the read/write head of the hard disk drive, and a limiting mechanism capable of selectively attaching and detaching a respective portion of the bracket to and from the load beam during operation. The load beam has a dimple projecting toward the bracket and which normally contacts a first surface of the bracket. The slider is attached to a second surface of the bracket opposite the first surface. The limiting mechanism attaches a portion of the bracket bearing the slider to the load beam when the read/write head is unloaded from the disk. Therefore, the wobbling of the slider is suppressed during the unloading operation. On the other hand, the portion of the bracket bearing the slider is detached from the load beam during a read/write operation to allow the slider to pitch and roll more freely about the dimple.

20 Claims, 14 Drawing Sheets

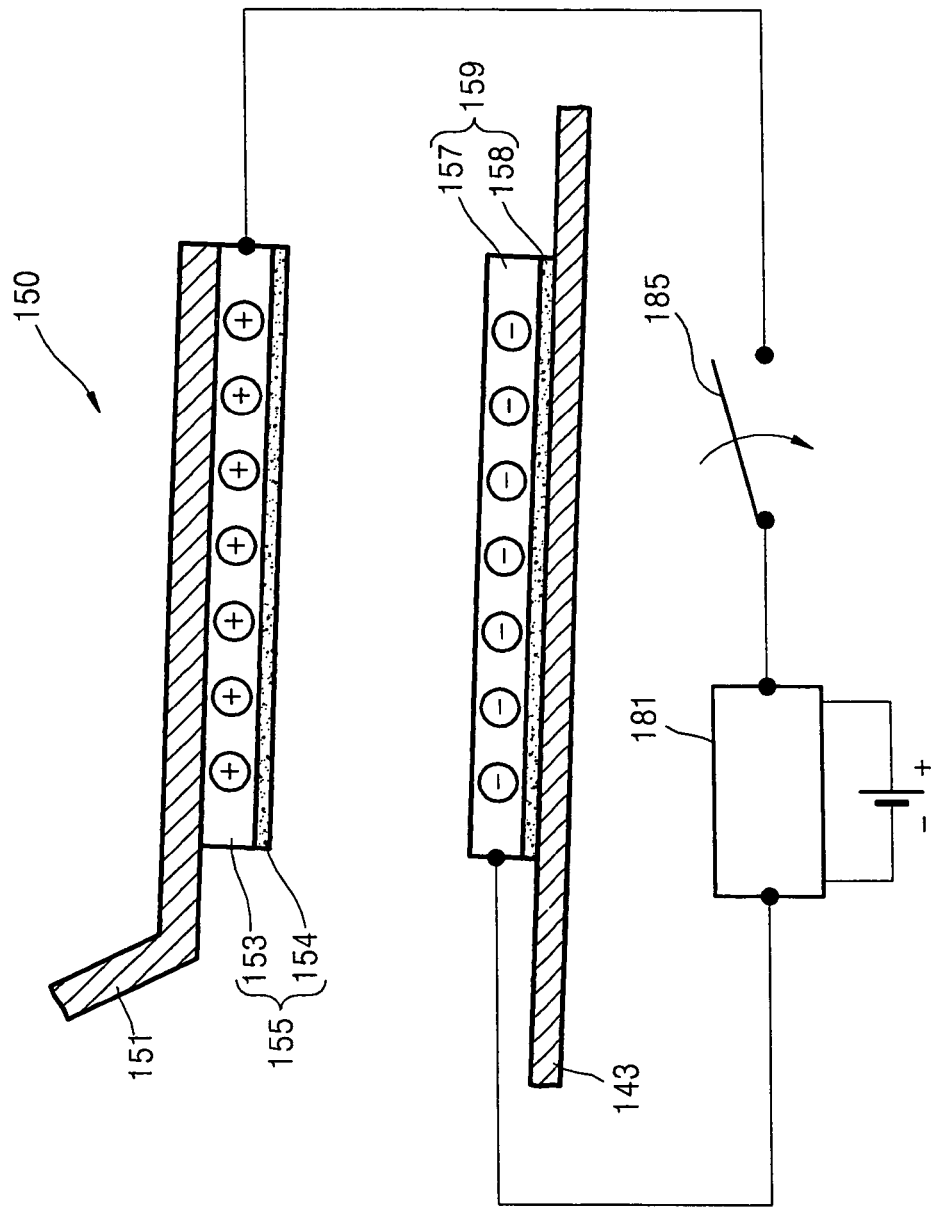

HARD DISK DRIVE, SUSPENSION ASSEMBLY OF ACTUATOR OF HARD DISK DRIVE, AND METHOD OF OPERATION OF HARD DISK DRIVE

BACKGROUND OF THE INVENTION

1. Field of the Invention

The present invention relates to a hard disk drive (HDD). More particularly, the present invention relates to the suspension assembly of an HDD which supports the read/write head.

2. Description of the Related Art

Hard disk drives (HDDs), which are used by computers to store information, read data recorded on a disk or write data onto the disk using a read/write head. Such HDDs include an actuator for positioning the read/write head over the disk and a suspension assembly. The read/write head is mounted to the suspension assembly and the suspension assembly is attached to a front end of the actuator.

Referring to FIG. 1, a conventional suspension assembly 40 includes a load beam 41, a bracket 43 having a flexure and attached to the load beam 41, a slider 49 mounted to the bracket 43, and a stopper 50. The front end of the load beam 41 forms a lift tab 47, and an intermediate part of the load beam 41 forms a dimple 45 projecting towards the bracket 43. The load beam 41 and the bracket 43 contact each other through the dimple 45. A read/write head of the HDD (not shown) is attached to the slider 49. The read/write head reads data recorded on a disk 20 or writes data onto the disk 20. The slider 49 is a negative pressure type slider, which means that both positive and negative air bearing pressure arises on different parts of an air bearing surface of the slider during its flight over the disk 20.

The disk 20 rotates at a high speed while the read/write head is reading/writing data. Air that is induced to flow between the disk 20 and the slider 49 generates a lift force on the suspension assembly 40. As a result, the read/write head attached to the slider 49 writes or reads data while hovering at a predetermined height above the disk 20. At this time, the dimple 45 allows the slider 49 to roll and pitch to a limited extent. When the HDD is turned off and the disk 20 stops rotating, the slider 49 is moved off of the disk 20 (unloading operation) and the lift tab 47 at the front end of the load beam 41 is moved along and then parked on a parking ramp (not shown) so that the slider 49 is stable.

The lift tab 47 is moved by the parking ramp in a direction away from a surface of the disk 20 during the parking operation, i.e., the parking ramp exerts a normal force on the lift tab 47 having a component $F_r$ perpendicular to the surface of the disk 20. On the other hand, a suction force $F_a$, which is the resultant force of the negative pressure arising on the air bearing surface of a slider 49, acts on the slider 49 as the lift tab 47 is moved away from the surface of the disk 20 in the direction of the component $F_r$. The suction force forces the slider 49 towards the surface of the disk 20. Thus, the bracket 43 is flexed away from the load beam 41 to such an extent that the bracket 43 is separated from the dimple 45 of the load beam 41. Initially, though, the slider 49 may be prevented from contacting the surface of the disk 20 by the stopper 50.

However, the above-described conditions cause the bracket 43 to vibrate in a direction normal to the surface of the disk 20 (Z direction). The slider 49 is likely to collide with the surface of the disk 20 if the slider 49 continues to vibrate or pitches in a direction θ about the dimple 45. The stopper 50 can prevent the slider 49 from being displaced beyond a preset distance from the dimple 45 but cannot control the movement of the slider 49 itself. Accordingly, the conventional suspension assembly can not always prevent the read/write head from colliding with the surface of the disk 20 during the unloading process and thereby permanently damaging the disk drive or destroying the data recorded on the disk 20.

Also, the actuator can be rotated at a relatively low angular velocity during the unloading operation to minimize the vibrations of the slider 49. However, in this case, the relatively long time required for the unloading operation creates other problems for the suspension assembly and HDD.

SUMMARY OF THE INVENTION

An object of the present invention is to provide a suspension assembly of an actuator of a hard disk drive, which can prevent collisions between the suspension assembly and a disk by limiting the degree of freedom of a slider during an unloading operation.

Another object of the present invention is to provide an improvement in a hard disk drive so that the hard disk drive can execute an unloading operation in a relatively short amount of time and without any collisions between a suspension assembly and a data storage disk of the drive.

Likewise, still another object of the present invention is to provide a method of operation of a hard disk drive in which the wobbling of a slider is suppressed during an unloading operation so that collisions between the slider and disk are prevented and so that the unloading operation can be carried out in a relatively short amount of time.

1According to one aspect of the present invention, there is provided a suspension assembly of an actuator for use in a hard disk drive, wherein the suspension assembly has a load beam having a dimple, a slider that carries the read/write head of the hard disk drive, a bracket which extends from the load beam and supports the slider, and a limiting mechanism operative to selectively attach and detach the load beam and the bracket to and from each other. The bracket has a flexure at which the bracket can flex, a rear end at which the bracket is fixed to the load beam and from which the bracket extends forward in the longitudinal direction of the load beam, a first surface that is normally in contact with the dimple of the load beam, and a second surface opposite the first surface and to which the slider is attached. The limiting mechanism selectively attaches and detaches the load beam and the bracket to and from each other at a location spaced forward from the rear end of the bracket in the longitudinal direction of the load beam. Thus, the limiting mechanism can attach the load beam and the bracket to each other to suppress wobbling of the slider when the read/write head carried by the slider is unloaded from a disk of the hard drive. Also, the limiting mechanism can detach the load beam and the bracket from one another to allow the slider pitch and roll more freely about the dimple when the read/write head carried by the slider is loaded on the disk.

According to another aspect of the present invention, there is provided an improvement in a hard disk drive having a housing, and a spindle motor, an actuator and a parking ramp disposed within the housing, at least one data storage disk mounted to the spindle motor, and wherein the actuator includes a swing arm supported so as to be rotatable about a pivot axis, and a suspension assembly attached to and projecting from a front end of the swing arm, wherein the improvement resides in incorporating the above-described limiting mechanism into the suspension assembly.

According to another aspect of the present invention, the limiting mechanism preferably comprises a first plate disposed on the load beam, a second plate disposed on the bracket as facing the first plate, and a power supply unit operatively connected to the first and second plates so as to supply charges of opposite polarities to the first second plates, respectively.

According to still another aspect of the present invention, there is provided a method of operation of such a hard disk drive, wherein the method comprises performing a loading operation which includes rotating the swing arm in a first direction of rotation to move the read/write head over a surface of the disk, and performing an unloading operation which includes rotating the swing arm in an opposite direction of rotation to move the read/write head radially off of the surface of the disk, parking the lift tab of the suspension assembly on the parking ramp by sliding the lift tab along the parking ramp, and attaching the bracket of the suspension assembly to the load beam of the suspension assembly at a point in time after the lift tab begins to slide along the parking ramp. The bracket is attached to the load beam at a location spaced forward from the rear end of the bracket in the longitudinal direction of the load beam.

Preferably, the bracket is attached to the load beam by exerting an electrostatic force on a plate attached to the bracket. In this respect, the state of contact between the dimple and the bracket can be monitored. For example, current may be produced in a circuit that includes the load beam and the bracket, and the electrical resistance in the circuit can be detected. The bracket is attached to the load beam as soon as the monitoring reveals that the dimple and the bracket have separated from each other.

BRIEF DESCRIPTION OF THE DRAWINGS

The above and other objects, features and advantages of the present invention will become more apparent from the following detailed description of the preferred embodiments thereof made with reference to the attached drawings in which:

FIG. 5 is a schematic diagram of a limiting mechanism of the suspension assembly according to the present invention as illustrated within circle V in FIG. 4;

DETAILED DESCRIPTION OF THE PREFERRED EMBODIMENTS

Figure 2:
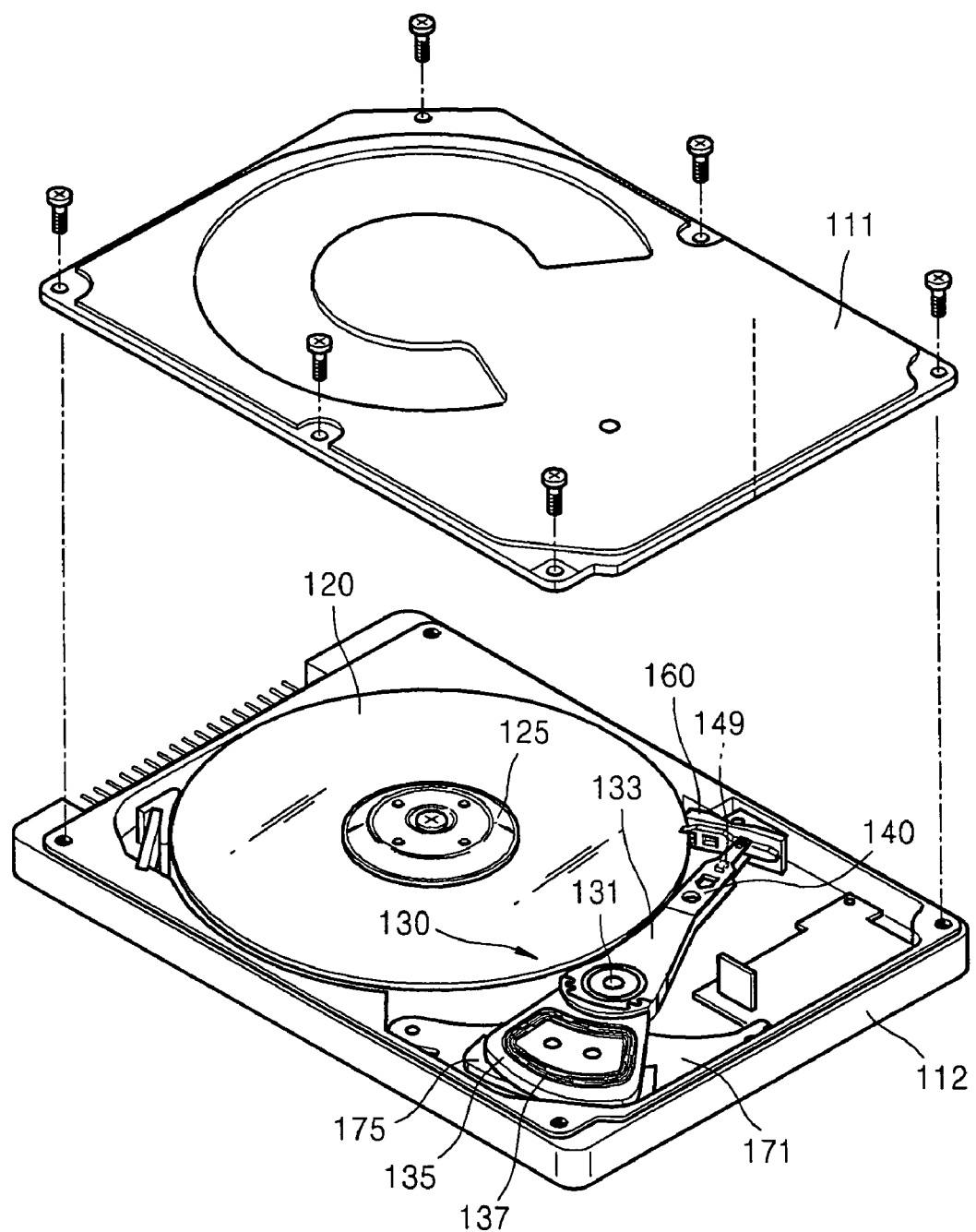
FIG. 2 is an exploded perspective view of a hard disk drive (HDD) having a suspension assembly according to the present invention.

Referring to FIG. 2, an HDD according to the present invention includes a housing having a cover 111 and a base 112 to which the cover 111 is attached, a spindle motor 125, an actuator 130, and a parking ramp 160. The spindle motor 125, actuator 130 and parking ramp 160 are disposed within the housing as mounted to the base 112. The housing prevents foreign material from damaging the parts accommodated therein and prevents operating noise from sounding outside the housing. At least one data storage disk 120 is mounted to the spindle motor 125 so as to be rotated at a high speed by the motor. The actuator 130 moves a read/write head over the disk 120. The actuator 130 includes an actuator pivot 131 disposed on the base 112, a swing arm 133 supported so as to be rotatable about the pivot 131, a suspension assembly 140 attached to and projecting from a front end of the swing arm 133, a slider 149 attached to the front end of the suspension assembly 140, a coil support 135 coupled to a rear end of the swing arm 133, and a voice coil motor (VCM). The slider 149 carries the read/write head.

The VCM rotates the swing arm 133 in a direction according to Fleming's Left Hand Rule due to current flowing through the VCM coil 137 and the magnetic field generated by magnets 175. The VCM coil 137 is wound around the coil support 135. The magnets 175 are respectively disposed above and below the VCM coil 137 and face the VCM coil 137. A yoke 171 disposed on the base 112 supports the magnets 175.

Figure 3:
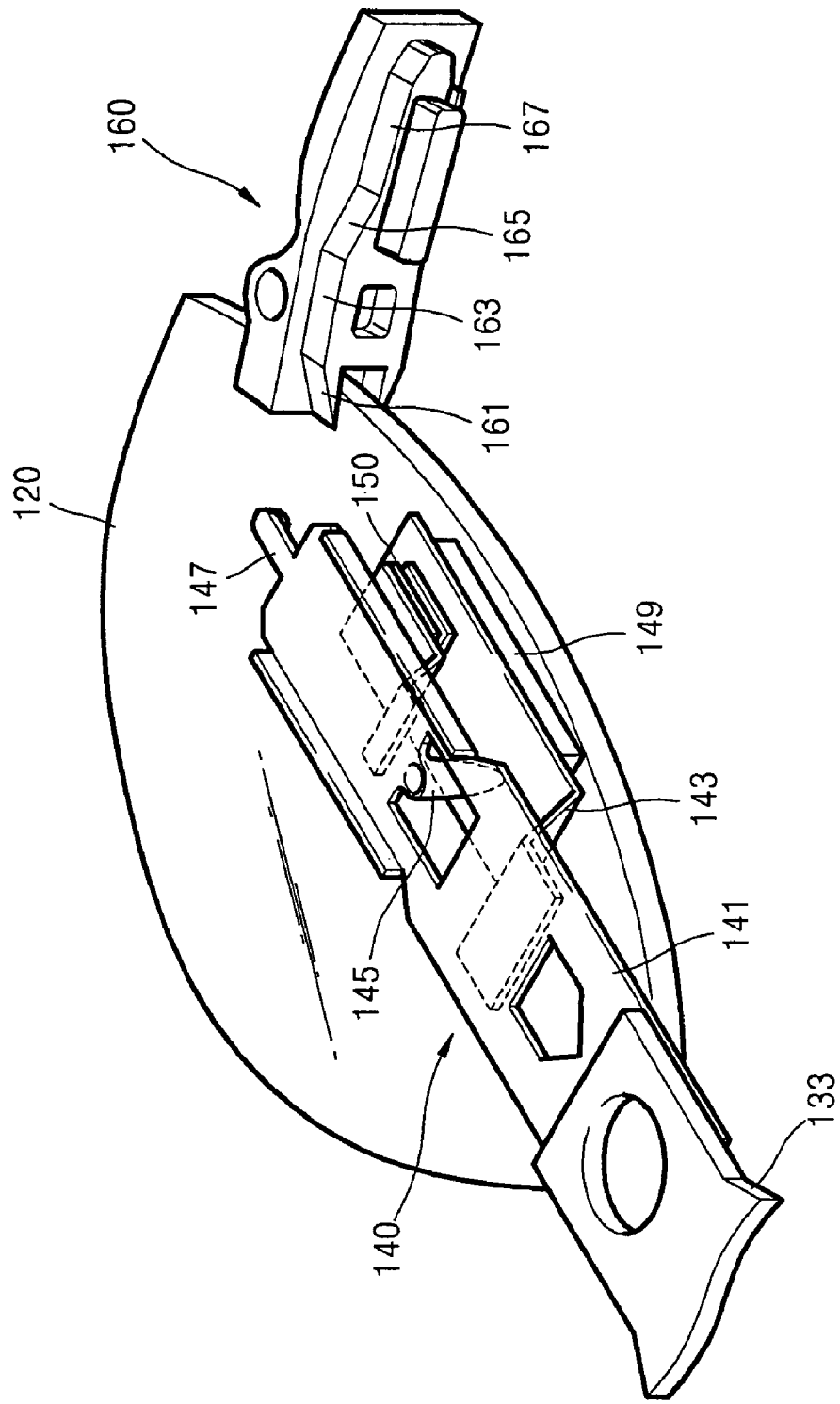
FIG. 3 is a perspective view of the suspension assembly.
Figure 4:
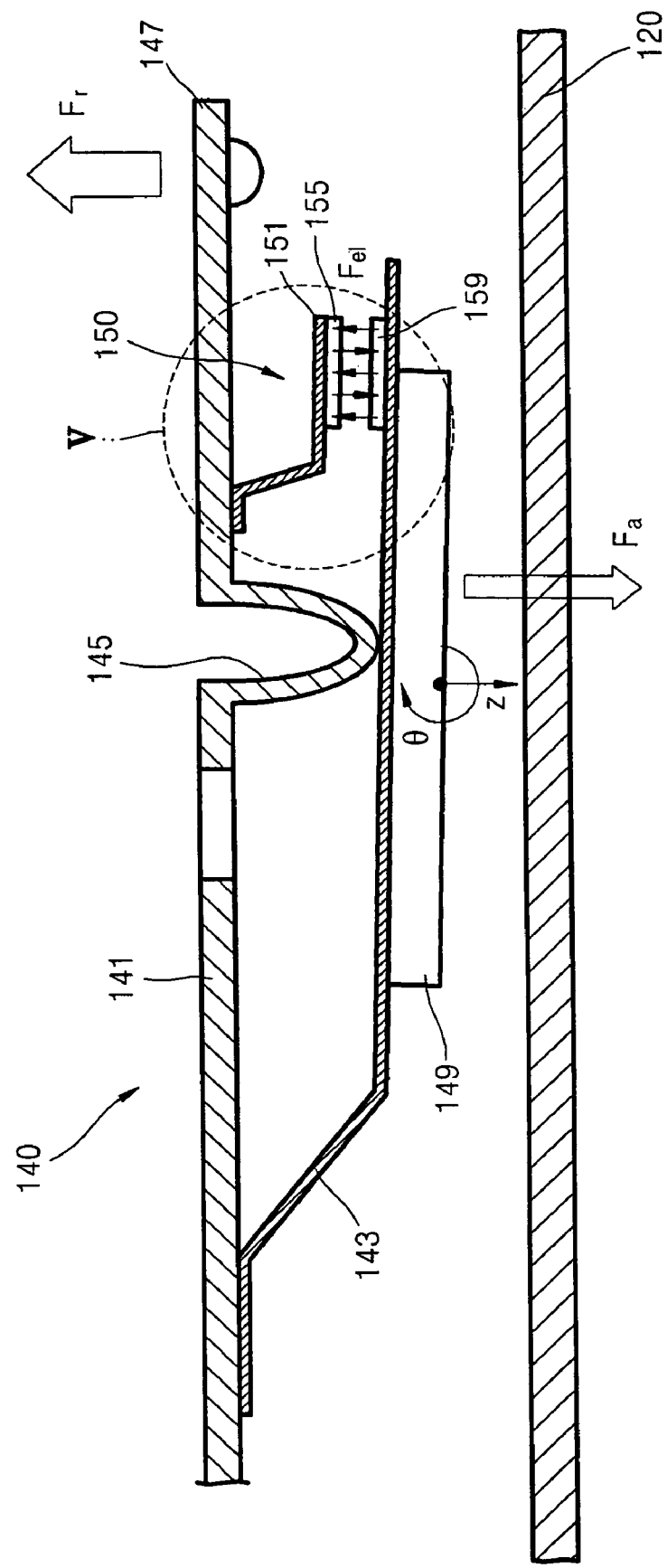
FIG. 4 is a vertical sectional view of the suspension assembly.

When the HDD is turned on (loading operation) and the disk 120 begins to rotate, the VCM rotates the swing arm 133 in a predetermined direction, e.g., counter-clockwise, to move the slider 149 over the disk 120. The slider 149 is lifted to a predetermined height above a surface of the disk 120 by air pressure created between the rotating disk 120 and the slider 149. In this state, the read/write head carried by the slider 149 follows a certain track of the disk 120 to write or read data onto or from the disk 120. On the other hand, when the HDD is turned off and the disk 120 stops rotating, the VCM rotates the swing arm 133 in the opposite direction, e.g., clockwise, to move the slider 149 off of the disk 120 (unloading operation). Referring now to FIGS. 3 and 4, the suspension assembly 140 includes a load beam 141 coupled to a front end of the swing arm 133, and a bracket 143 that has a flexure and supports the slider 149. The slider 149 is biased by the bracket 143 towards the disk 120. The load beam 141 has a downwardly protruding dimple 145 that is disposed in point contact with the bracket 143. Thus, the slider 149 can roll and pitch while it hovers above the disk 120 during a read/write operation. A lift tab 147 is formed at a front end of the load beam 141. The lift tab 147 is slid along the parking ramp 160 during the unloading of the read/write head from the disk 120. The lift tab 147 is parked on the parking ramp 160 at the end of the unloading operation. In this (parked) state, the slider 149 and hence, the read/write head, is stably supported radially outwardly of the disk 120.

The suspension assembly 140 also includes a limit mechanism 150 interposed between the load beam 141 and the bracket 143. Basically, the limit mechanism 150 is driven during a certain stage of the unloading operation to restrain the slider 149, i.e., inhibit the wobbling of the slider 149, as the lift tab 147 begins to move along the parking ramp 160.

More specifically, the parking ramp 160 has a plurality of support surfaces which guide the lift tab 147 as the read/write head is moved off of (radially outwardly from) the disk 120. The support surfaces of the parking ramp 160 include an inclined surface 161 that guides the lift tab 147 away from the surface of the disk 120 as the read/write head is initially unloaded (moved radially outwardly from the disk 120), a horizontal guide surface 163 that guides the lift tab 147 in a horizontal direction as the read/write head is moved further away (radially outwardly) from the surface of the disk 120, a seating surface 167 on which the lift tab 147 is seated when it is parked, and a restriction surface 165 that is inclined in a direction opposite to the inclined surface 161 to prevent the parked lift tab 147 from being arbitrarily moved toward the disk 120 by external forces.

Thus, the parking ramp 160 acts to exert a resultant upward force $F_r$ on the load beam 141 as the lift tab 147 is slid along the inclined surface 161 at the beginning of the unloading operation. At the same time, airflow is being induced between the slider 149 and the disk 120 due to the rotation of the disk 120. The airflow provides positive pressure that serves as an air bearing to keep the slider 149 off the surface of the disk 120 during a read/write operation. The resultant upward force $F_r$ raises the slider 149 through the bracket 143 connecting the slider 149 to the load beam 141. As a result, at some time after the unloading operation begins, a vacuum (negative pressure) is created between the negative pressure type slider 149 and the surface of the disk 120. The negative pressure results in a downward force $F_a$ acting on the slider 149.

The load beam 141 and the bracket 143 are separated from each other, i.e. the bracket 143 is elastically deformed at its flexure, due to the force $F_r$ exerted on the lift tab 147 and the force $F_a$ exerted on the slider 149 during the unloading operation. The slider 149 moves vertically away from the surface of the disk 120 due to the elasticity of the bracket 143 once the load beam 141 and the bracket 143 have become separated by a certain amount. These effects if left unchecked could cause the bracket 143 to shake, in turn causing the slider 149 to pitch in a direction θ about the dimple 145 or vibrate in a vertical direction (Z direction). As described previously, such wobbling of the slider 149 could cause the slider 149 to collide with the surface of the disk 120 and thereby cause permanent damage to the HDD and the read/write magnetic head.

However, the suspension assembly 140 according to the present invention employs the limiting mechanism 150 to actively suppress the wobbling of the slider 149 and thereby prevent the slider 149 from colliding with the surface of the disk 120. The limiting mechanism 150 includes a first plate 155 and a second plate 159 facing each other. The first and second plates 155 and 159 are fixed to the load beam 141 and the bracket 143, respectively. More specifically, the first plate 155 may be attached to the load beam 141 by a support arm 151, and the second plate 159 may be directly bonded to the bracket 143. The support arm 151 is a cantilever having a fixed end fixed to the load beam 141 and a freely movable end to which the first plate 155 is attached.

Referring to FIG. 5, the first and second plates 155 and 159 are connected to a power supply circuit including a constant (DC) voltage source 181. For example, the first plate 155 may be connected to a positive terminal of the constant voltage source 181, and the second plate 159 may be connected to a negative terminal of the constant voltage source 181. In addition, the power supply circuit may include a switch 185 that selectively supplies power from the constant voltage source 181 to the first and second plates 155 and 159. The switch 185 is operated by a controller of the HDD to turn the limiting mechanism 150 on or off.

A predetermined voltage is established by the power supply circuit between the first plate 155 and the second plate 159 when the switch 185 is closed. As a result, static charges of opposite polarities accumulate on the first and second plates 155 and 159, respectively, and the first plate 155 and the second plate 159 are thus electrostatically attracted to each other. In this case, the slider 149 is prevented from pitching about or moving vertically relative to the dimple 145 because the bracket 143 to which the slider 149 is attached is held fixed relative to the load beam 141 by the limiting mechanism 150. Thus, collisions between the slider 149 and the disk 120 due to the wobbling of the slider 149 can be avoided. On the other hand, the first and second plates 155 and 159 lose their charges when the switch 185 is opened and are thus no longer attracted to each other. At this time, the slider 149 is allowed to move more freely relative to the load beam 141. That is, the slider 149 can pitch or roll about the dimple 145 of the load beam 141 so that it can achieve high stability when it hovers over the disk 120 during a read/write operation.

Referring still to FIG. 5, each of the first and second plates 155 and 159 includes an insulating film and a sheet electrode. More specifically, the first plate 155 includes a first sheet electrode 153 and an insulating film 154 that faces the second plate 159. The insulating film 154 prevents a discharge between the first and second plates 155 and 159 charged with opposite polarities, and quickly allows (residual) static charges to dissipate from the first and second plates 155 and 159 when the limiting mechanism 150 is turned off. The second plate 159 includes a second sheet electrode 157 and an insulating film 158 that is interposed between the second plate 159 and the bracket 143. The insulating film 158 prevents charges from being transferred between the bracket 143 and the second electrode plate 157, and prevents the slider 149 from being magnetized and thereby damaged. Each of the first and second electrode plates 153 and 157 may be made of a thin metal film having superior electrical conductivity so as to be readily charged by the power supply circuit.

The limiting mechanism 150 may be turned on when the dimple 145 and the bracket 143 begin to separate. That is, the limiting mechanism 150 may be turned on during the unloading process when the load beam 141 and the bracket 143 are separated from each other as the slider 149 is pulled toward the surface of the disk 120 by the force $F_a$ shown in and described with respect to FIG. 4. The state (contact or separation) between the dimple 145 and the flexure 143 can be determined by measuring the electrical resistance therebetween in real time. To this end, the limiting mechanism 150 may include an electrical loop passing through the dimple 145 and the flexure 143.

Figure 6A:
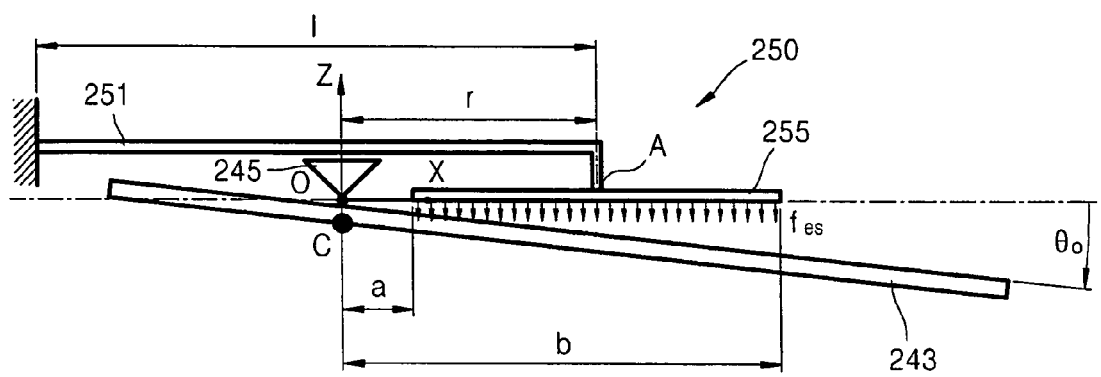
FIGS. 6A through 7B are diagrams of a model of a limiting mechanism according to the present invention for use in finite element analysis.
Figure 6B:
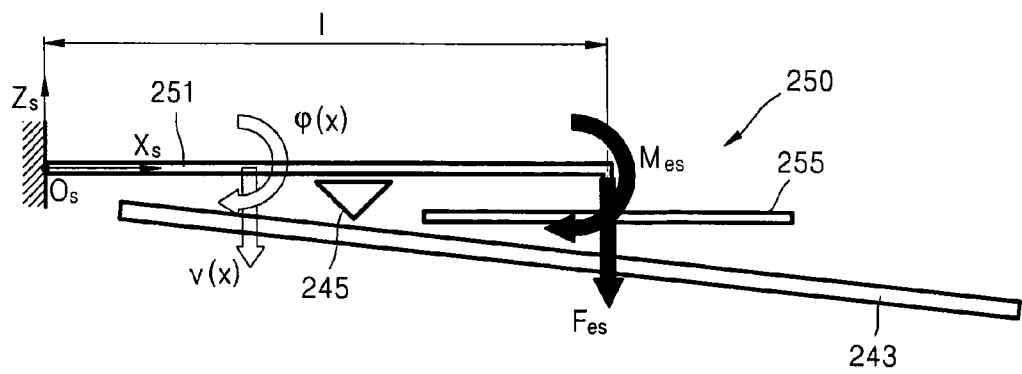

FIGS. 6A and 6B illustrate a finite element model 250 of a limiting mechanism according to the present invention. Referring to FIGS. 6A and 6B, an elastic member 251 analogous to a load beam coupled to a swing arm of an HDD extends horizontally as cantilever so as to have a fixed end and a free end. The model 250 also includes a solid body 243 (analogous to the bracket that supports the slider containing the read/write head of the HDD), a first plate 255 supported by the elastic member 251, and a second plate (not shown) lying along a surface of the solid body 243 as facing the first plate 255. More specifically, the free end of the elastic member 251 is bent and supports the first plate 255 at the center A of the first plate 255. The model 250 also includes a dimple 245 interposed between the elastic member 251 and the solid body 243.

Consider the case in which electrostatic forces $f_{es}$ are generated over the entire surface of the first plate 255 (or over the entire surface of the second plate facing the first plate 255) when the dimple 245 and the solid body 243 are out of contact. In this case, the elastic member 251 is elastically deformed and is pulled toward the bracket 243. Such electrostatic forces $f_{es}$ generated over the entire surface of the first plate 255 may be expressed in terms of an equivalent force $F_{es}$ acting at the central point A of the first plate 255 and a moment $M_{es}$ about the central point A. The equivalent force $F_{es}$ and moment $M_{es}$ are mathematically represented by the following equations (1):

$$F_{es} = \frac{\varepsilon_0 w_{lock} U^2}{2\theta_0^2}\left(\frac{b-a}{ab}\right) \quad (1)$$

$$M_{es} = \frac{\varepsilon_0 w_{lock} U^2}{2\theta_0^2}\left(\ln\left(\frac{b}{a}\right) + \frac{b^2-a^2}{2ab}\right)$$

wherein $\varepsilon_0$ denotes the dielectric permittivity with respect to air and is generally $8.854 \times 10^{-12}$ F/m, $W_{lock}$ denotes the width of the first plate 255 (0.6 mm in an embodiment of the present invention), a and b respectively denote the distance between the dimple 245 and a leading edge of the first plate 255 and the distance between the dimple 245 and a trailing edge of the first plate 255 (0.196 mm and 1.109 mm, respectively, in the embodiment), $\theta_o$ denotes a critical angle of pitch of the solid body 243 at the time the dimple 245 is separated therefrom (520 μrad in the embodiment as determined through geometrical analysis).

If a potential difference U between the first plate 255 and the second plate is 1 V, the equivalent force $F_{es}$ and the moment $M_{es}$ at and about point A are 41.3 μN and 9.898 μN-mm, respectively. If the load applied to the elastic member 251 is calculated in this manner, the vertical displacement V and the rotational displacement φ of the elastic member 251 can be represented as functions of the length Xs of the elastic member 251, i.e., as (V(Xs), φ (Xs)), respectively. The vertical displacement V(l) and the rotational displacement φ (l) of the elastic member 251 at point A when the length $X_s$ of the elastic member 251 is l are 81.8 μm and 19.3 μrad, respectively, as given by $$v(l) = \frac{1}{EJ_y}\left(\frac{F_{es}l^3}{2} + \frac{M_{es}l^2}{2}\right) \quad (2)$$

$$\varphi(l) = \frac{1}{EJ_y}\left(\frac{F_{es}l^2}{3} + M_{es}l\right)$$

wherein l denotes the length of the elastic member 251, E denotes the coefficient of elasticity of the elastic member 251, and $J_y$ denotes the inertia of the cross section of the elastic member 251. Elastic module of standard stainless steel equal to E=190 GPa and 147.2×25.4 μm² cross-section were adopted for the elastic member 251. In order for the first plate 255 to be attached to the second plate when the dimple 245 is spaced from the solid body 243, the leading edge and the trailing edge of the first plate 255 must be displaced vertically by distances $d_{leading}$ and $d_{trailing}$, respectively, which are calculated as shown below.

$$d_{leading} = a \sin \theta_0 \cong 0.11 \text{ μm}$$

$$d_{trailing} = b \sin \theta_0 \cong 0.58 \text{ μm} \quad (3).$$

Referring to FIG. 4, the displacements V(l) and φ (l) caused by an electrostatic force when the input voltage U is 1 V (see Equations 4 below) are several orders greater than the geometrical displacements $d_{leading}$, $d_{trailing}$, and $\theta_0$. Therefore, the elastic member 251 will be flexed to such an extent that the first plate 255 attaches to the solid body 243 when the solid body 243 is oriented at the critical angle of pitch.

$$v(l)=81.8 \text{ μm} > d_{trailing}=0.58 \text{ μm} > d_{leading}=0.11 \text{ μm}$$

$$\varphi(l)=19.3 \text{ mrad} > \theta_0=0.52 \text{ mrad} \quad (4).$$

Moreover, the electrostatic force occurring between the first plate 255 and the second plate is dependent on the voltage impressed thereacross. As the voltage increases, the electrostatic force between the plates increases. As concerns the present invention, the power supply circuit is preferably as small as possible while still providing enough electrostatic force to sufficiently flex the bracket 151. It was confirmed from additional finite element analysis that the first plate 255 and the second plate will be attached to each other even when the input voltage U is as small as 0.1 V. Thus, the power supply circuit of the limiting mechanism according to the present invention can be small, the HDD can be compact, and the manufacturing costs associated therewith are minimal.

Figure 7A:
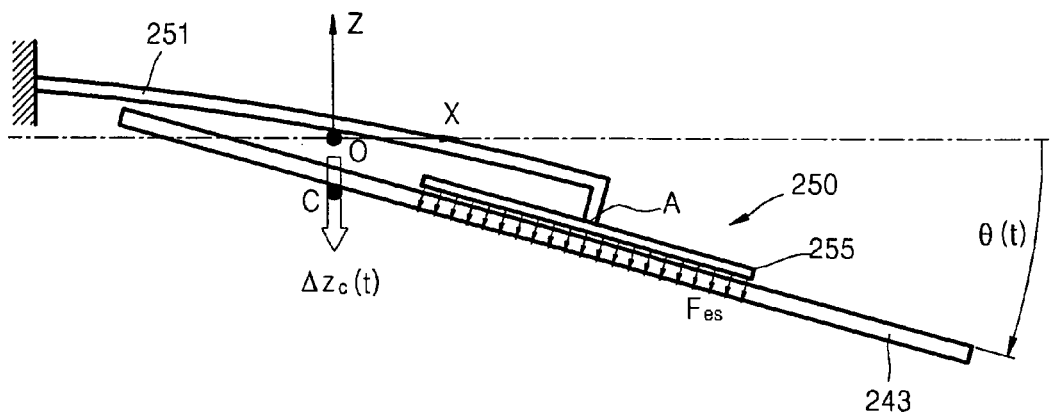
Figure 7B:
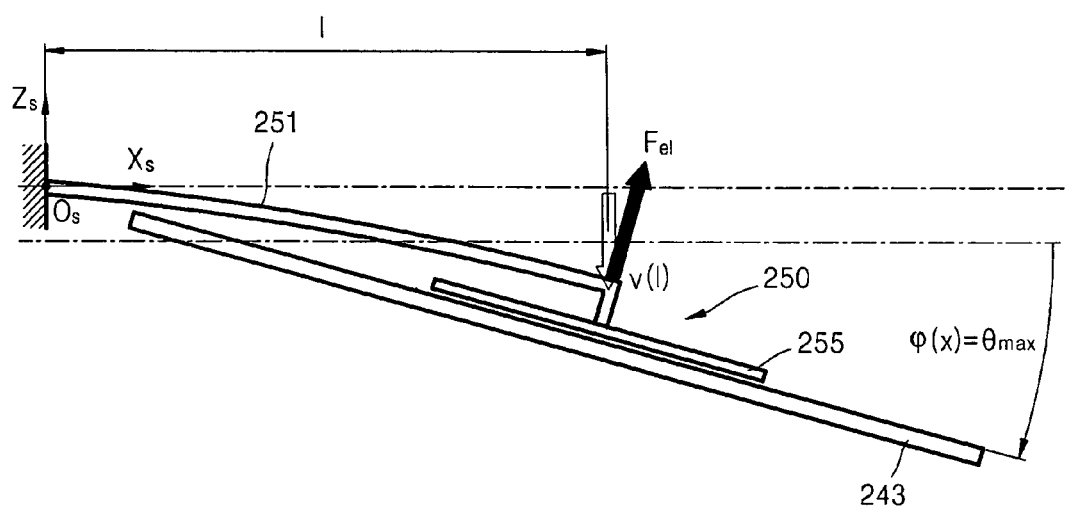

FIGS. 7A and 7B illustrate a state of the finite element model of the limiting mechanism according to the present invention in which the solid body 243 is at its maximum angle of pitch once the dimple 245 and the solid body 243 have separated from each other and an insulating film is incorporated into the model between the first and second plates. This state represents that of the suspension assembly just before the read/write head contacts a disk. The first and second plates should remain attached even when the solid body 243 is at its maximum angle of pitch.

In this model, the electrostatic forces acting across the entire surface of the first plate 255 (or the second plate facing the first plate 255) can be expressed in terms of an equivalent force $F_{es}$ acting at the center A of the first plate 255. The equivalent force $F_{es}$ can be calculated from the Equation (5) as follows:

$$F_{es} = \frac{\varepsilon_{de}\varepsilon_0 S_{lock} U^2}{2h_{de}}. \quad (5)$$

wherein $h_{de}$ denotes the thickness of an insulating film disposed between the first plate 255 and the second plate (0.05 μm in an embodiment of the present invention), $\varepsilon_{de}$ denotes the relative dielectric permittivity of the insulating film ($10 \times 10^{-12}$ F/m in an embodiment of the present invention), and $S_{lock}$ denotes the area of the first plate 255 and satisfies $S_{lock}=l_{lock} \times w_{lock}$, where $l_{lock}=b-a$. Substituting these values into Equation (5), the equivalent force $F_{es}$ at the center A of the first plate 255 is:

$$F_{es(l > l_{dimple})}=9.7 \text{ mN} \quad (6).$$

Employing a geometrical analysis, the maximum angle $\theta_{max}$ of pitch the slid body 243 and the maximum vertical displacement $\Delta Z_{Cmax}$ of the solid body 243 at a point C where the dimple is located are given by:

$$\theta_{max} = \theta(t_{extr}) \cong 9 \text{ mrad}, t_{extr} > t_{dmple}$$

$$\Delta z_{Cmax} = \Delta z_C(t_{extr}) \cong 5.7 \text{ μm}, t_{extr} > t_{dmple} \quad (7).$$

Accordingly, the maximum vertical displacement $V(t_{extr}, 1)$ and the maximum rotational displacement $\phi(t_{extr}, 1)$ at the center A of the first plate 255 are given by:

$$v(t_{extr}, l) = \Delta z_{Cmax} + r \sin \theta_{max}, t_{extr} > t_{dmple}$$

$$\phi(t_{extr}, l) = \theta_{max}, t_{extr} > t_{dmple} \quad (8).$$

According to the Theory of Elasticity, the equivalent force $(F_{el}^{(1)}, F_{el}^{(2)})$ applied to the center A of the first plate that will yield the maximum vertical displacement $V(t_{extr}, 1)$ and the maximum rotational displacement $\phi(t_{extr}, 1)$ can be calculated from Equations (9), respectively, as follows:

$$F_{el}^{(1)} = \frac{3EJ_y v(l)}{l^3 \cos\theta_{max}} = 5.5 \text{ μN} \quad (9)$$

$$F_{el}^{(2)} = \frac{2EJ_y \varphi(l)}{l^2 \cos\theta_{max}} = 17.7 \text{ μN}.$$

Thus, the equivalent force at the center A of the first plate must be approximately 18 μN to produce both of the necessary vertical and rotational displacements. The electrostatic force $F_{es}$=9.7 mN when the input voltage U is 1 V is several orders greater than the load $F_{elmax}$=18 μN necessary to deform the elastic member 251 such that the elastic member has the same orientation as the solid body 243.

$$F_{es(t > t_{dmple})} > F_{elmax} \cong 18 \text{ μN} \quad (10).$$

Accordingly, when the voltage U impressed across the first and second plates is 1 V and the solid body 243 is maximally deformed corresponding to the condition right before the read/write head contacts the disk, the first plate 255 and the second plate remain attached to each other. Even when the voltage U is 0.1 V, the equivalent force of attraction between the first and second plates is 97 μN, which is about five times greater than that necessary to hold the first plate 255 and the second plate together.

Figure 8A:
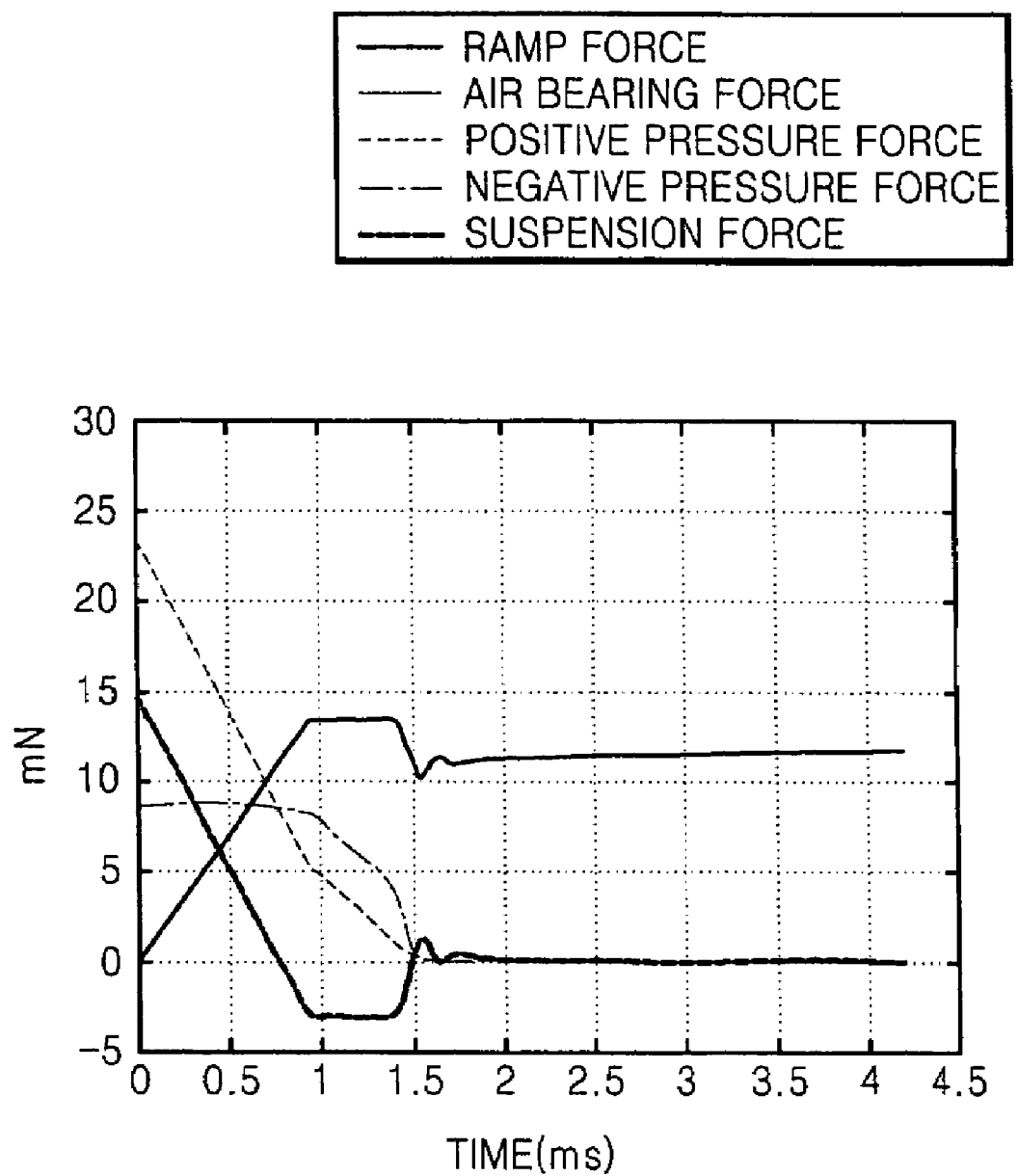
FIGS. 8A and 8B are graphs illustrating various forces applied during an unload operation to a suspension assembly according to the present invention and to a conventional suspension assembly, respectively.
Figure 8B:
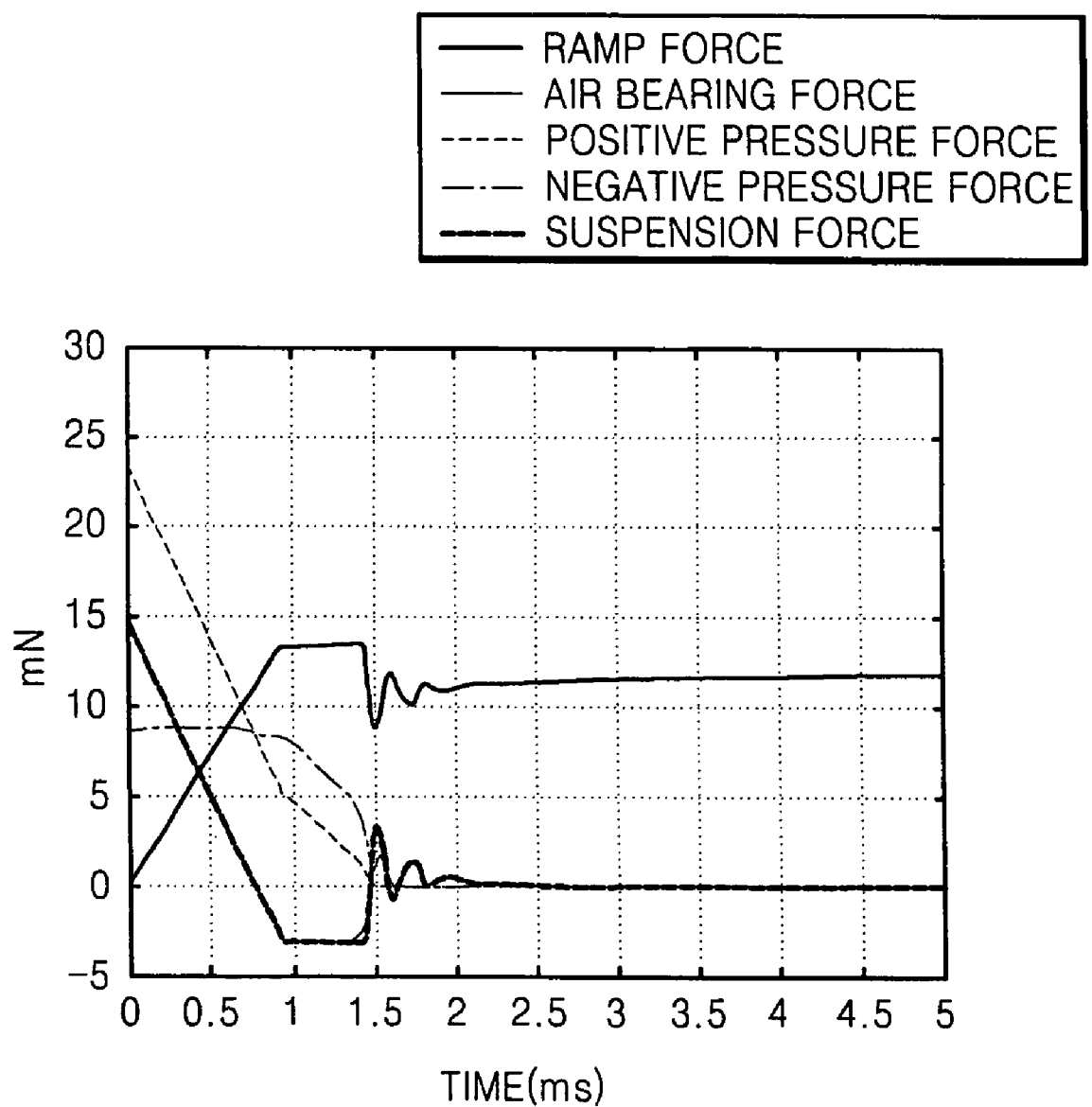

FIG. 8A is a graph of various loads applied during an unloading operation to a suspension assembly employing a limiting mechanism according to the present invention. FIG. 8B is a graph of the various loads applied during an unloading operation to a conventional suspension assembly employing a stopper. When the unloading begins and the lift tab 147 enters the parking ramp 160, the lift tab 147 experiences a reaction force from the support surface of the parking ramp 160 (ramp force in the graph). The ramp force increases substantially and linearly at an initial stage of the unloading operation. Also, during this time, positive pressure and negative pressure are exerted on the slider 149 due to the airflow along the surface of the disk 120 and the pulling of the slider 149 away from the surface of the disk as created by the parking operation. The force of the positive pressure rapidly and the force of the negative pressure gently decreases as the slider center position (FIG. 9A and 9B) and slider pitch angle (FIG. 11A and 11B) increases since the ramp force permanent action and L/UL tab displacement (FIG. 9A and 9B) gradual increase. Accordingly, the net force (air bearing force in the graph) resulting from the positive pressure and negative pressure at this initial stage of the unloading operation eventually acts in a direction tending to move the slider 149 toward the surface of the disk 120 (when the air bearing force has a negative value in the graph). The suspension assembly 140 that supports the slider 149 is designed to have an elasticity having a profile similar to that of the air bearing force so as to counteract the air bearing force.

The profiles of the ramp force, the air bearing force, and the suspension force exhibit undulations about 1.5 ms after the lift tab 147 enters the parking ramp 160. These undulations are illustrative of vibrations generated when the slider 149 lifts relative to the surface of the disk 120. As is clear from a comparison of FIGS. 8A and 8B, the suspension assembly 140 of the present invention suppresses these vibrations (amplitude and number) to a significantly greater extent than the conventional suspension assembly. Thus, the present invention can prevent collisions between the slider 149 and the surface of the disk 120.

Figure 1:
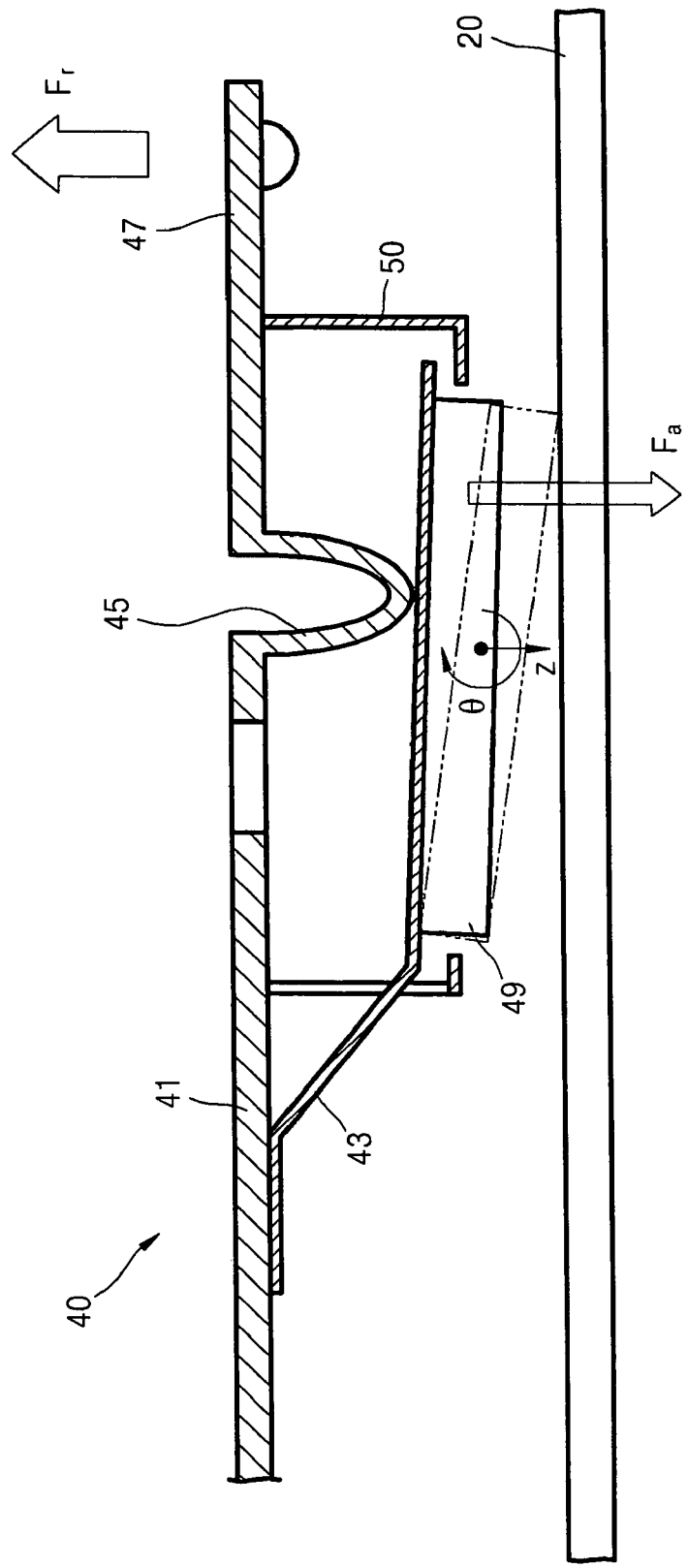
FIG. 1 is a vertical sectional view of a conventional suspension assembly of an HDD.
Figure 9A:
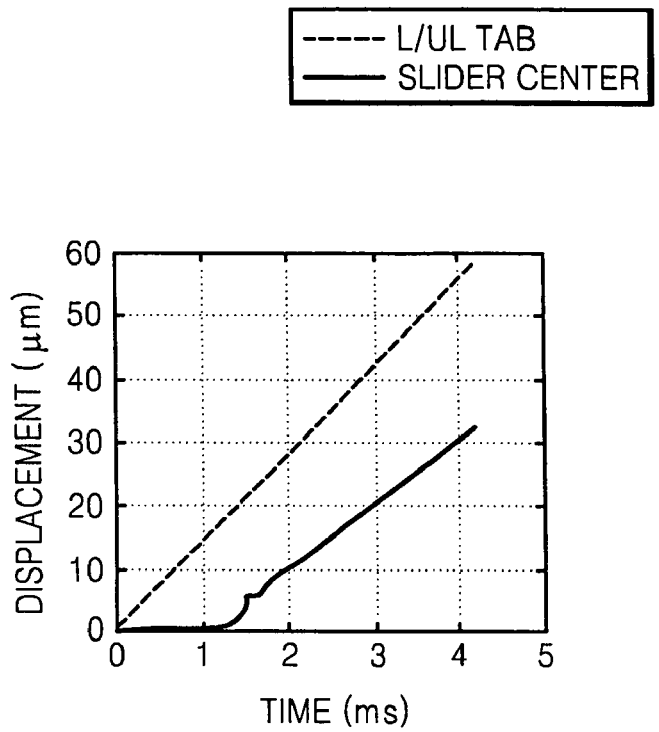
FIGS. 9A and 9B are graphs illustrating vertical displacements of a lift tab and a slider in a suspension assembly according to the present invention and in a conventional suspension assembly, respectively.
Figure 9B:
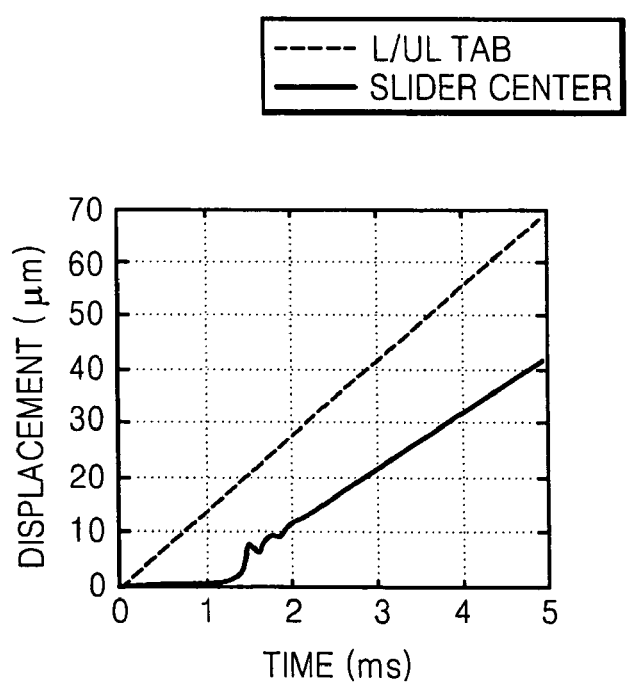

FIG. 9A is a graph of the vertical displacement of a lift tab 147 and a slider 149 during the unloading operation in a suspension assembly employing a limiting mechanism 150 according to the present invention (FIG. 4). FIG. 9B is a graph of the vertical displacement of a lift tab 47 and a slider 49 during the unloading operation in a conventional suspension assembly employing a stopper 50 (FIG. 1). In each of FIGS. 9A and 9B, the dashed line represents the vertical displacement of the lift tab, and the solid line represents the vertical displacement of the center of the slider. In each case, the vertical displacement of the lift tab increases linearly and the vertical displacement of the slider remains almost constant as the lift tab initially moves along the inclined surface of the parking ramp. However, in the case of the conventional suspension assembly, the slider 49 vibrates substantially once it is separated from the disk by the stopper 150, as shown in the profile of the vertical displacement of the center of the slider in FIG. 9B. On the other hand, the limiting mechanism 150 of the suspension assembly 140 according to the present invention suppresses the wobbling of the slider 149 at the time the slider 149 begins to lift away from the disk. Compared to the conventional suspension assembly, the slider 149 undergoes moderate vibration when the slider 149 separates from the disk 120.

Figure 10A:
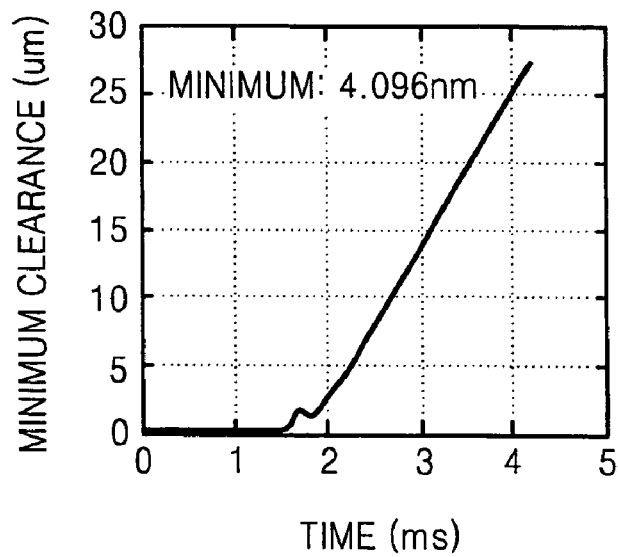
FIGS. 10A and 10B are graphs illustrating clearance between a slider and a surface of a disk during unloading operations in a suspension assembly according to the present invention and in a conventional suspension assembly, respectively.
Figure 10B:
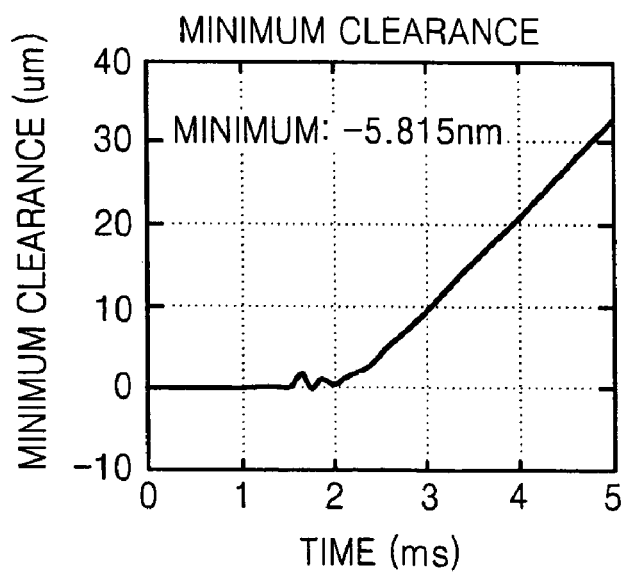

FIG. 10A is a graph of the clearance between the slider 149 and the surface of a disk 120 during the unloading operation in the suspension assembly having a limiting mechanism 150 according to the present invention (FIG. 4). FIG. 10B is a graph of the clearance between the slider 49 and the surface of a disk 20 during the unloading operation in the conventional suspension assembly having a stopper 150 (FIG. 1). As each of FIGS. 10A and 10B show, the clearance between the slider and the surface of the disk varies as the slider vibrates. However, the vibrations that occur in the suspension assembly of the present invention are smaller than those that occur in the conventional suspension assembly. The minimum clearance between the slider 149 and the surface of the disk 120 during the unloading operation is calculated to be +4.096 nm in the suspension assembly 140 of the present invention. On the other hand, the minimum clearance between the slider 49 and the surface of the disk 20 during the unloading operation is calculated to be −5.815 nm in the conventional suspension assembly. This negative value means that the slider 49 will collide with the surface of the disk 20.

Figure 11A:
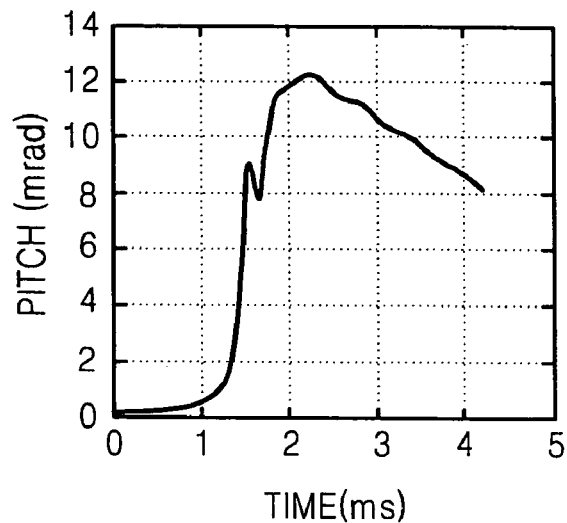
FIGS. 11A and 11B are graphs illustrating the pitch (angular displacements) of a slider in a suspension assembly according to the present invention and in a conventional suspension assembly, respectively.
Figure 11B:
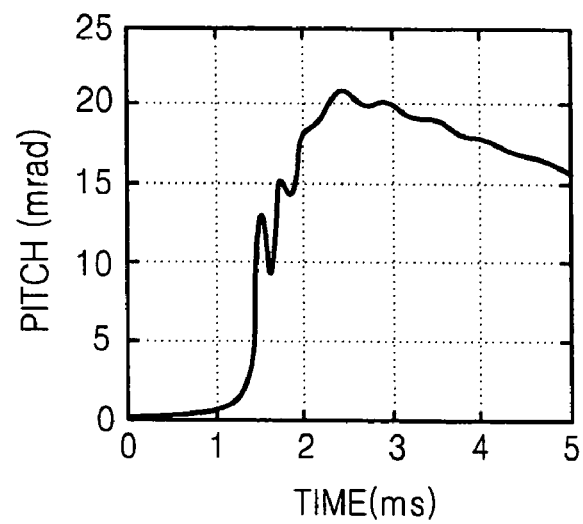

FIG. 11A is a graph illustrating the pitch of the slider 149 during the unloading operation in a suspension assembly employing a limiting mechanism 150 according to the present invention (FIG. 4). FIG. 11B is a graph illustrating the pitch of the slider 49 during the unloading operation in a conventional suspension assembly having a stopper 50 (FIG. 1). During an unloading operation, the maximum pitch of the slider 149 of the suspension assembly of the present invention is approximately 12 mrad and the maximum pitch of the slider 49 of the conventional suspension assembly is approximately 20 mrad or nearly two times that in the present invention.

Figure 12:
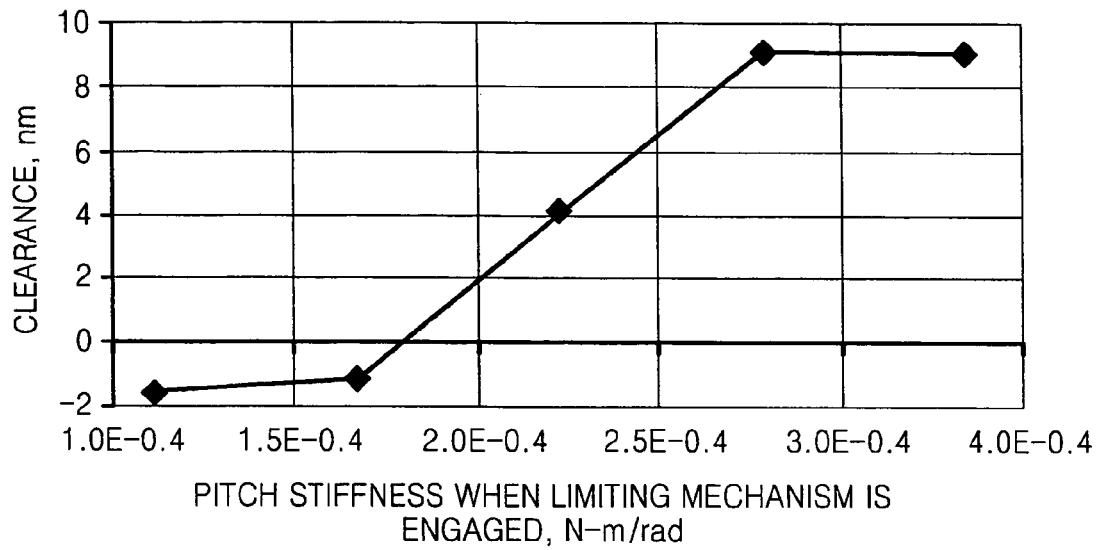
FIG. 12 is a graph illustrating a relationship between pitch stiffness and clearance between a suspension assembly and the surface of a disk according to the present invention.

FIG. 12 is a graph illustrating a relationship between the pitch stiffness of the bracket 143 and the clearance between the slider 149 and disk 120 during an unloading operation according to the present invention. The pitch stiffness of the bracket 143 represents the magnitude of a moment required to rotate the slider 149 by a unit angle about the dimple 145, that is, the resistance of the bracket 143 to the pitching of the slider 149. The slider 149 should be able to freely move about the dimple 145 when the read/write head is loaded on and is disposed over the disk 120. At this time, the limiting mechanism 150 should be off so that the pitch stiffness of the bracket 143 is low. The pitch stiffness of the bracket 143 increases sharply when the limiting mechanism is 150 is turned on as the unloading operation begins. In this way, the wobbling of the slider 149 in the direction of pitch at the point intimae the slider 149 lifts relative to the surface of the disk 120 can be minimized. In FIG. 12, the horizontal axis represents the pitch stiffness of the bracket 143 when the limiting mechanism 150 is turned on. As shown in the figure, the clearance between the slider 149 and the surface of the disk 120 increases as the pitch stiffness increases because the wobbling of the slider 149 is prevented as the pitch stiffness increases. According to an embodiment of the present invention, the minimum clearance during an unload operation should be 3 nm or more. Thus, the limiting mechanism 150 should be designed to impart a pitch stiffness to the bracket 143 of greater than approximately 2.1 E-0.4 N-m/rad.

Figure 13:
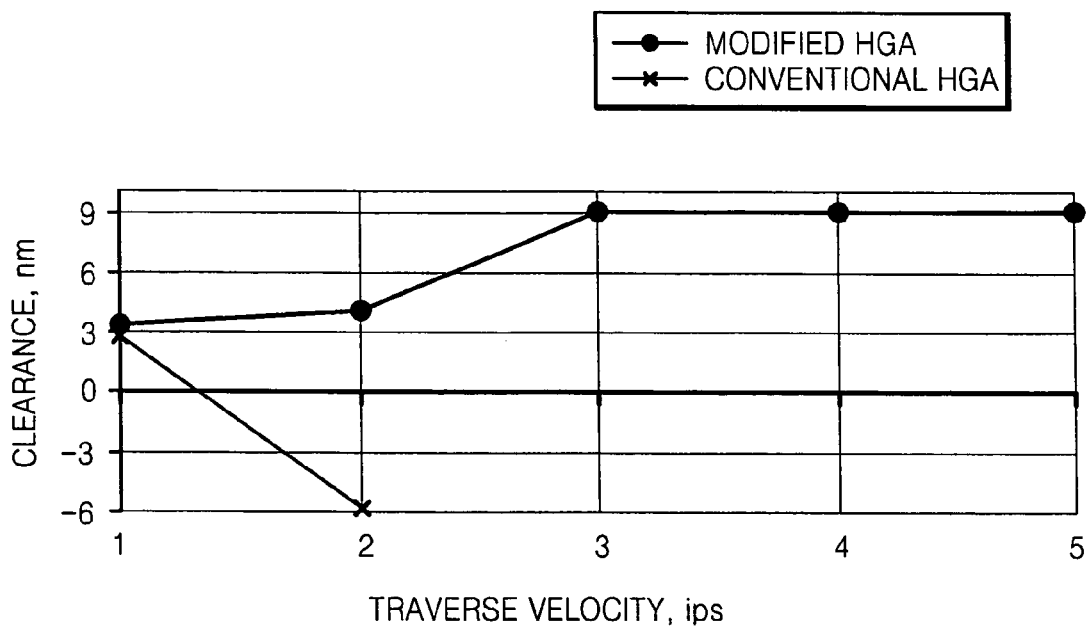
FIG. 13 is a graph illustrating relationships between the traverse velocity of a lift tab and clearance between a slider and a surface of a disk in an HDD employing a suspension assembly according to the present invention and in an HDD employing a conventional suspension assembly.

FIG. 13 is a graph illustrating a calculated relationship between the traverse velocity of a lift tab and the unload operation clearance between a slider and a disk in a suspension assembly according to the present invention (modified HGA) and the prior art (conventional HGA). Referring to FIG. 13, the conventional suspension assembly is characterized in that as the traverse velocity of the lift tab 47 increases, the clearance sharply decreases, for example, from a value of approximately 1.3 ips to a negative (−) value. The negative (−) value of the clearance is indicative of a state in which the slider and the surface of the disk have collided. On the other hand, the suspension assembly according to the present invention is characterized in that as the traverse velocity of the lift tab 147 increases, the clearance changes gradually and increases only slightly. As shown in the graph, the suspension assembly according to the present invention can maintain a clearance beyond the tolerance of 3 nm as long as the traverse velocity of the lift tab 147 is within the range 1 to 5 ips. Accordingly, the traverse velocity of the lift tab 147 can be five times higher than that in the conventional suspension assembly, i.e., the operation can be performed in much less time.

Figure 14:
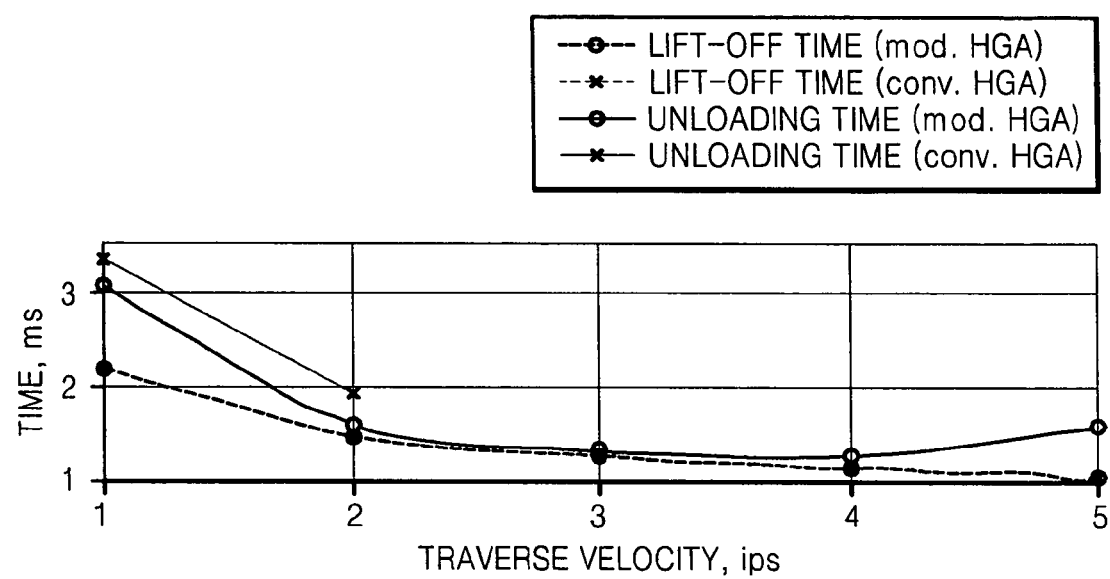
FIG. 14 is a graph illustrating relationships between the traverse velocity of a lift tab and lift-off time and between the traverse velocity of the lift tab and unloading time in an HDD employing a conventional suspension assembly and in an HDD employing a suspension assembly according to the present invention.

FIG. 14 is a graph illustrating a relationship between the traverse velocity of a lift tab and the lift-off time of a slider and a relationship between the traverse velocity of the lift tab and unloading time, in the conventional suspension assembly (conv. HGA) and the suspension assembly according to the present invention (mod. HGA). The lift-off time refers to the time it takes for the slider to lift relative to the surface of the disk after the unloading operation begins. In this respect, the relationships between the traverse velocity of the lift tab and the lift-off time in both the mod. HGA and the conv. HGA are similar in that the lift-off time gradually decreases as the traverse velocity of the lift tab 147 increases. The unloading time refers to the time it takes for the unloading operation to be carried out. In this respect, the relationships between the traverse velocity of the lift tab and the unloading time in both the mod. HGA and the conv. HGA show similar characteristics in that the unloading time decreases as the traverse velocity of the lift tab decreases. That is, the profiles of the relationships have similar gradients. However, the unloading time in an HDD having the suspension assembly of the present invention is approximately 16% shorter than that in an HDD employing the conventional suspension assembly because the limiting mechanism 150 suppresses vibration of the slider 149 and thereby prevents a delay in the unloading operation.

As described above, according to the present invention, the degree of freedom of the slider during the unloading operation is limited and collisions between the slider and the disk are prevented. Accordingly, a stable unloading operation is carried out even at remarkably high speeds, i.e., even when the angular velocity of the swing arm and suspension assembly is high.

Finally, although the present invention has been described above in connection with the preferred embodiments thereof, it is to be understood that the scope of the present invention is not so limited. On the contrary, various modifications of and changes to the preferred embodiments will be apparent to those of ordinary skill in the art. For example, the limiting mechanism has been shown and described as using electrostatic means to selectively attach and detach the bracket bearing the slider to and from the load beam. Alternatively, the limiting mechanism may employ electromagnetic or mechanical means. Thus, changes to and modifications of the preferred embodiments may fall within the true spirit and scope of the invention as defined by the appended claims.

What is claimed is:

1. A suspension assembly of an actuator of a hard disk drive, comprising:
   a load beam having a dimple;
   a slider that carries the read/write head of the hard disk drive;
   a bracket having a flexure, a rear end at which the bracket is fixed to the load beam and from which the bracket extends forward in the longitudinal direction of the load beam, a first surface that is normally in contact with the dimple, and a second surface opposite the first surface and which supports the slider; and
   a limiting mechanism operative to selectively attach and detach the load beam and the bracket to and from each other at a location spaced forward from the rear end of the bracket in the longitudinal direction of the load beam, whereby the limiting mechanism can attach the load beam and the bracket to each other to suppress wobbling of the slider when the read/write head carried by the slider is unloaded from a disk of the hard drive, and the limiting mechanism can detach the load beam and the bracket from one another to allow the slider pitch and roll more freely about the dimple when the read/write head carried by the slider is loaded on the disk.

2. The suspension assembly of claim 1, wherein the limiting mechanism comprises:
   a first plate and a second plate facing each other, the first plate being disposed on the load beam and the second plate being disposed on the bracket; and
   a power supply unit operatively connected to the first and second plates so as to supply charges of opposite polarities to the first second plates, respectively.

3. The suspension assembly of claim 2, wherein the limiting mechanism further comprises a support arm to which the first plate is attached, the support arm having a fixed end at which the support arm is fixed to the load beam and a free end to which the first plate is attached.

4. The suspension assembly of claim 3, wherein the support arm is a bent member of an elastic material.

5. The suspension assembly of claim 2, wherein the second plate is attached directly to a surface of the bracket facing the first plate.

6. The suspension assembly of claim 2, wherein the power supply unit comprises:
   a constant voltage source supplying a constant direct current voltage; and
   a switch operative to selectively supply and cut off power from the constant voltage source to the first and second plates.

7. The suspension assembly of claim 2, wherein the limiting mechanism further comprises an electrically insulating film disposed on the first plate and facing the second plate.

8. The suspension assembly of claim 2, wherein the limiting mechanism further comprises an electrically insulating film interposed between the second plate and the bracket.

9. In a hard disk drive having a housing, and a spindle motor, an actuator and a parking ramp disposed within the housing, at least one data storage disk mounted to the spindle motor, and
   wherein the actuator includes a swing arm supported so as to be rotatable about a pivot axis, and a suspension assembly attached to and projecting from a front end of the swing arm, and
   the suspension assembly includes a load beam having a dimple and a lift tab that slides along and is parked on the parking ramp during an unloading operation, a slider that carries a read/write head which is moved off of the disk during the unloading operation, and a bracket having a flexure, a rear end at which the bracket is coupled to the load beam and from which the bracket extends forward in the longitudinal direction of the load beam, a first surface that is normally in contact with the dimple, and a second surface opposite the first surface and which supports the slider, the improvement comprising:
   a limiting mechanism operative to selectively attach and detach the load beam and the bracket to and from each other at a location spaced forward from the rear end of the bracket in the longitudinal direction of the load beam, whereby the limiting mechanism can attach the load beam and the bracket to each other to suppress wobbling of the slider during the unloading operation, and the limiting mechanism can detach the load beam and the bracket from one another to allow the slider pitch and roll about the dimple during a loading operation in which the read/write head carried by the slider is loaded on the disk.

10. The improvement in a hard disk drive as claimed in claim 9, wherein the limiting mechanism comprises:
    a first plate and a second plate facing each other, the first plate being disposed on the load beam and the second plate being disposed on the bracket; and
    a power supply unit operatively connected to the first and second plates so as to supply charges of opposite polarities to the first second plates, respectively.

11. The improvement in a hard disk drive as claimed in claim 10, wherein the limiting mechanism further comprises a support arm to which the first plate is attached, the support arm having a fixed end at which the support arm is fixed to the load beam and a free end to which the first plate is attached.

12. The improvement in a hard disk drive as claimed in claim 11, wherein the support arm is a bent member of an elastic material.

13. The improvement in a hard disk drive as claimed in claim 10, wherein the second plate is attached directly to a surface of the bracket facing the first plate.

14. The improvement in a hard disk drive as claimed in claim 10, wherein the power supply unit comprises:
    a constant voltage source supplying a constant direct current voltage; and
    a switch operative to selectively supply and cut off power from the constant voltage source to the first and second plates.

15. The improvement in a hard disk drive as claimed in claim 10, wherein the limiting mechanism further comprises an electrically insulating film disposed on the first plate and facing the second plate.

16. The improvement in a hard disk drive as claimed in claim 10, wherein the limiting mechanism further comprises an electrically insulating film interposed between the second plate and the bracket.

17. A method of operating of a hard disk drive having a housing, and a spindle motor, an actuator and a parking ramp disposed within the housing, at least one data storage disk mounted to the spindle motor, and a read/write head attached to the actuator, and
    wherein the actuator includes a swing arm supported so as to be rotatable about a pivot axis, and a suspension assembly attached to and projecting from a front end of the swing arm, and
    the suspension assembly includes a load beam having a dimple and a lift tab, a slider that carries the read/write head, and a bracket having a flexure, a rear end at which the bracket is coupled to the load beam and from which the bracket extends forward in the longitudinal direction of the load beam, a first surface that is normally in contact with the dimple, and a second surface opposite the first surface and which supports the slider, the method comprising:
    performing a loading operation comprising rotating the swing arm in a first direction of rotation about the pivot axis to move the read/write head over a surface of the disk; and
    performing an unloading operation including rotating the swing arm in a second direction of rotation opposite to said first direction to move the read/write head radially off of the surface of the disk,
    parking the lift tab on the parking ramp by sliding the lift tab along the parking ramp, and
    attaching the bracket to the load beam, at a location spaced forward from the rear end of the bracket in the longitudinal direction of the load beam, at a point in time after the lift tab begins to slide along the parking ramp.

18. The method of claim 17, wherein the attaching of the bracket to the load beam comprises exerting an electrostatic force on a plate attached to the bracket.

19. The method of claim 18, further comprising monitoring the state of contact between the dimple and the bracket, and wherein the bracket is attached at said location to the load beam on the basis of said monitoring as soon as the monitoring reveals that the dimple and the bracket have separated from each other.

20. The method of claim 19, wherein said monitoring comprises producing a detection voltage in a circuit that includes the load beam and the bracket, and detecting the electrical resistance in the circuit.

* * * * *